United States Patent
Shenoy et al.

(10) Patent No.: US 9,419,556 B2
(45) Date of Patent: Aug. 16, 2016

(54) METHOD AND ARRANGEMENT FOR OPERATING A PUMP

(71) Applicant: ABB OY, Helsinki (FI)

(72) Inventors: Laxmikantha Shenoy, Bangalore (IN); Ahmed Syed, Bangalore (IN); Chetan Patange, Bangalore (IN); Deepak Pandey, Bangalore (IN); Mikko Lammi, Bangalore (IN); Rahul Raj, Bangalore (IN); Satyan Rn, Bangalore (IN)

(73) Assignee: ABB Technology Oy, Helsinki (FI)

( * ) Notice: Subject to any disclaimer, the term of this patent is extended or adjusted under 35 U.S.C. 154(b) by 21 days.

(21) Appl. No.: 14/498,099

(22) Filed: Sep. 26, 2014

(65) Prior Publication Data
US 2015/0091487 A1    Apr. 2, 2015

(30) Foreign Application Priority Data

Sep. 27, 2013    (IN) .......................... 4400/CHE/2013

(51) Int. Cl.
*H02P 27/04*    (2016.01)
*F04D 13/06*    (2006.01)
*F04D 15/00*    (2006.01)
*H02P 29/02*    (2016.01)

(52) U.S. Cl.
CPC .............. *H02P 27/047* (2013.01); *F04D 13/06* (2013.01); *F04D 15/0088* (2013.01); *H02P 29/026* (2013.01)

(58) Field of Classification Search
CPC ............. H02P 1/28; H02P 1/30; H02P 27/04; G05F 1/67; G05F 5/00
USPC .............. 318/774, 778, 801, 805, 807, 808, 318/400.21, 400.22; 320/30, 101; 363/40, 363/95; 136/243, 244; 417/405; 323/30, 323/221, 906
See application file for complete search history.

(56) References Cited

U.S. PATENT DOCUMENTS

| | | | | |
|---|---|---|---|---|
| 4,494,180 | A * | 1/1985 | Streater | H02M 3/10 318/801 |
| 4,999,560 | A * | 3/1991 | Morishima | H02P 1/30 318/778 |
| 7,126,294 | B2 * | 10/2006 | Minami | G05F 1/67 318/139 |
| 7,148,650 | B1 * | 12/2006 | McNulty | H02J 7/35 136/243 |
| 2007/0290651 | A1 | 12/2007 | McNulty et al. | |

OTHER PUBLICATIONS

Office Action issued on Mar. 30, 2015, by the Australian Patent Office in corresponding Australian Patent Application No. 2014224159. (4 pages).

* cited by examiner

*Primary Examiner* — Antony M Paul
(74) *Attorney, Agent, or Firm* — Taft Stettinius & Hollister LLP

(57) ABSTRACT

A method and arrangement for operating a pump system are disclosed, the pump system including a pump arranged to be rotated with an AC motor, an inverter, the output of which is electrically connected to the AC motor, and a photovoltaic panel system electrically connected to feed DC power to the inverter. The method can include setting a voltage limit, and determining continuously voltage obtained from the photovoltaic panel system. When the determined voltage of the photovoltaic panel system is below the set voltage limit, frequency of the inverter can be controlled such that the ratio between output voltage of the inverter and the output frequency is substantially constant. When the determined voltage of the photovoltaic panel system exceeds the voltage limit, the inverter frequency can be controlled for keeping voltage of the photovoltaic panel system substantially at the voltage limit.

7 Claims, 1 Drawing Sheet

METHOD AND ARRANGEMENT FOR OPERATING A PUMP

RELATED APPLICATION

This application claims priority under 35 U.S.C. §119 to Indian Patent Application No. 4400/CHE/2013 filed in India on Sep. 27, 2013, the entire content of which is hereby incorporated by reference in its entirety.

FIELD

The present disclosure relates to pumping systems, such as pumping systems employing solar power.

BACKGROUND INFORMATION

Photovoltaic panels or photovoltaic panel systems are largely employed in generation of electricity. Known use of a photovoltaic panel is to charge a battery with the panel, and use the energy from the battery for electrical supply. The energy from the battery is well-regulated; i.e., the voltage available from a battery is known and substantially constant DC voltage.

The charging of the battery can be carried out efficiently using a charging controller having a maximum power point tracker (MPPT). MPPTs are used for driving the charging controller to the operating point in which a maximum amount of power can be extracted from the panel.

If the energy from the panel system is used in driving a motor load, a motor controller is further used. A motor controller can be, for example an inverter that produces alternating voltage from the DC voltage source. The alternating voltage can be employed to drive an alternating current motor, such as an induction motor. One known use of alternating motors is for rotating pumps in pumping applications.

When the solar panel system or photovoltaic panel system is used solely for pump applications, then the above described way of providing alternating voltage to a pump can be quite complicated and involves multiple electrical components. The number of required components can make the structure expensive and also vulnerable.

SUMMARY

A method is disclosed of operating a pump system having a pump arranged to be rotated with an AC motor, an inverter, an output of which is electrically connected to the AC motor, and a photovoltaic panel system electrically connected to feed DC power to an inverter, the method comprising: setting a voltage limit ($V_{boost}$); determining continuously a voltage obtained from the photovoltaic panel system; when the determined voltage of the photovoltaic panel system is below the set voltage limit, controlling an output frequency of the inverter such that a ratio between an output voltage of the inverter and the output frequency is substantially constant; and when the determined voltage of the photovoltaic panel system exceeds the voltage limit ($V_{boost}$), controlling the output frequency of the inverter for keeping the voltage of the photovoltaic panel system substantially at the voltage limit.

A pump arrangement is disclosed comprising: a pump arranged to be rotated with an AC motor; an inverter, an output of which is electrically connected to the AC motor; a photovoltaic panel system electrically connected to feed DC power to the inverter; means for setting a voltage limit ($V_{boost}$); means for determining continuously a voltage obtained from the photovoltaic panel system; means for controlling an output frequency of the inverter such that a ratio between an output voltage of the inverter and the output frequency is substantially constant when a determined voltage of the photovoltaic panel system is below the set voltage limit; and means for controlling the output frequency of the inverter for keeping the voltage of the photovoltaic panel system substantially at the voltage limit when the determined voltage of the photovoltaic panel system exceeds the voltage limit ($V_{boost}$).

BRIEF DESCRIPTION OF THE DRAWINGS

In the following discussion, features and advantages will be described in greater detail by way of exemplary embodiments with reference to the attached drawings, wherein.

DETAILED DESCRIPTION

A method and arrangement are disclosed for operating a pump.

Exemplary embodiments disclosed herein are based on the idea of using available DC voltage from the photovoltaic panel system directly at the input of an inverter, and controlling an output frequency of the inverter based on the available DC voltage.

Once the DC voltage reaches a set voltage as per a V/f ratio, the output frequency can be increased, and the voltage can be controlled to be substantially at a limit value by changing the output frequency of the inverter.

An exemplary advantage of such a method and arrangement is that a simple structure can be obtained and the properties of the photovoltaic panel system can still be fully utilized. In an exemplary arrangement, the output of a photovoltaic panel system can be directly connected to the input of an inverter, and the inverter can be further connected to feed an AC motor. The motor can be driven with an alternating voltage and the frequency.

The voltage/frequency ratio depends on the voltage obtained from the photovoltaic panel system. Once the voltage from the panel system exceeds an available limit, then the operation of the pump drive can be continued by increasing the output frequency and keeping the voltage substantially constant. The frequency can be increased as the photovoltaic panels are essentially current sources and are able to produce current for operating the motor even when the voltage of the panels has not increased to the rated voltage. The photovoltaic panel can deliver maximum power when the voltage has reached to a maximum limit and the photovoltaic panel has current capacity available. The solar pump drive will settle at maximum power point, deviating from a standard voltage/frequency curve by increasing frequency—keeping voltage constant and drawing more current from the photovoltaic panels.

Figure 1:
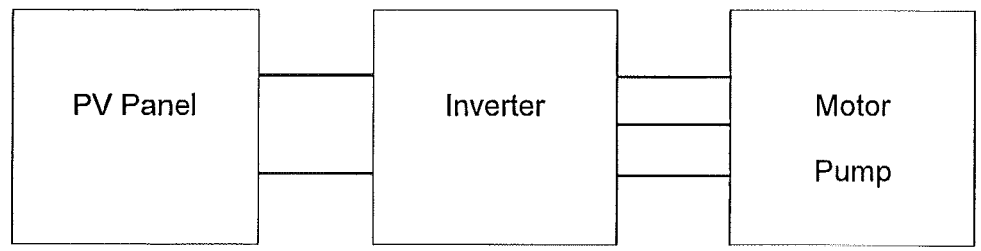
FIG. 1 shows a schematic block diagram of an exemplary arrangement as disclosed herein.

FIG. 1 shows how an exemplary photovoltaic panel system is connected to the input of an inverter. As known, photovoltaic panels produce DC voltage and this DC voltage can be directly used by the inverter. An inverter produces alternating voltage from the inputted DC voltage.

A known way of producing AC voltage is to use pulse width modulation (PWM) in which positive and negative DC voltages are alternately connected at the output. When the durations of positive and negative pulses are altered for each output phase, an alternating voltage with a desired frequency can be obtained at the output of the inverter.

According to an exemplary embodiment disclosed herein, an AC motor is connected at the output of the inverter and a pump is mechanically connected to the AC motor. The rotation of the motor drives the pump and carries out a pumping operation. In the example of FIG. 1, the inverter produces a three-phase output voltage for a three-phase motor.

Figure 2:
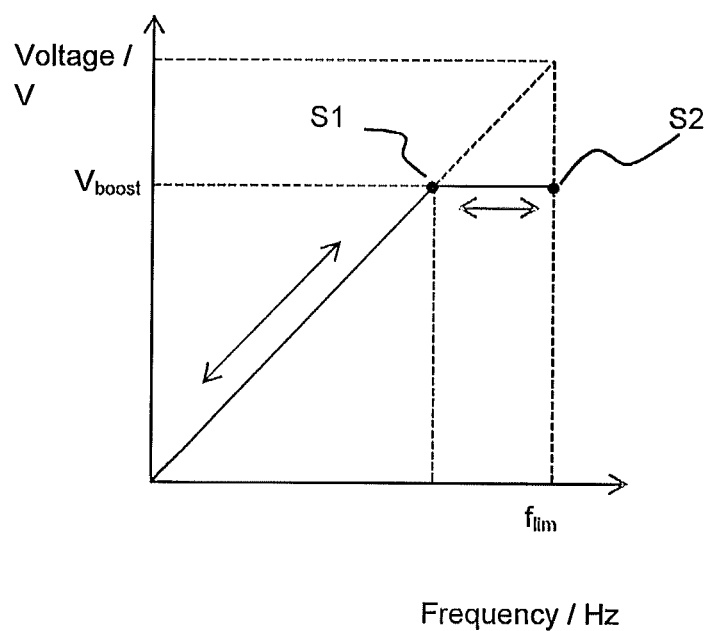
FIG. 2 shows an exemplary V/f-curve and operation points.

According to an exemplary embodiment disclosed herein, the control of the output frequency of the inverter can be carried out on the basis of the inputted voltage when the voltage is below a set limit. When the voltage is below the set limit $V_{boost}$, the ratio between the output voltage of the inverter and output frequency of the inverter can be kept substantially constant as shown in FIG. 2. The constant ratio between the output voltage and output frequency (constant Volts/Hertz; V/f) is known in the art of motor control. This control method keeps the torque of the motor constant, and in a known method, the control is applied throughout the speed range up to nominal speed of the motor. In an exemplary case, a full nominal voltage is available, and depending on a specified rotational speed, the inverter is modulated in such a manner that suitable voltage is outputted from the inverter so that the V/f ratio is constant.

As mentioned, according to an exemplary embodiment disclosed herein, the output frequency of the inverter is determined based on the available voltage from the photovoltaic panel system, and the idea is to use all of the energy available for the pumping process. In an exemplary embodiment, a voltage limit $V_{boost}$ is set. When the DC output voltage from the panel system exceeds the set DC voltage limit in the controller, the operation is continued by increasing the output frequency of the inverter and keeping output voltage supplied to the motor substantially constant.

The output voltage of the inverter and the obtained DC voltage from the panel depend on each other, and for simplicity FIG. 2 shows the inverter output voltage. In FIG. 2, operation point S1 shows a point in which the operation in the constant V/f mode is discontinued. The output voltage of the inverter is kept substantially constant until voltage reach the point S2.

The increase of the output frequency leads to increase in power demand of the motor. As known, the power is the product of the desired torque and the rotational speed. In a pump application, the torque will change with the square of the rotational speed. When the output frequency of the inverter; i.e., the rotational speed of the pump, is increased, a required torque of the motor will increase with the square of the speed change. The operation point of the motor is no longer in the constant V/f operation point.

The desired torque is produced by increasing the current supply to the motor from the photovoltaic panel system. Photovoltaic panels are in essence current sources and current from the panel is proportional to radiation received by the panel.

For keeping the power balance between input and output of the inverter, the generated power needs to match the used power. If the voltage of the input to the inverter is substantially constant, then the power change should be compensated by changing current. As already mentioned, the increase of rotational speed of the pump requires a change of torque. The torque should be produced with the supplied current from the panel. If the available power from the panel system is exceeded, the voltage of the panel will collapse.

Thus, by changing the output frequency, while monitoring the voltage at the output of the panel system, pump output can be kept at a maximum level. When the frequency is increased and the voltage is not collapsing, the PV-panel is able to provide the desired amount of current. If the measured voltage starts to go down, the output frequency of the inverter is reduced, thereby reducing the amount of current drawn from the panel.

The output frequency of the inverter is, for example, limited to the nominal value of the controlled motor. In such a case the increase in voltage reduces the current from the panel system. The operation point of the inverter varies between operation points S1 and S2 shown in FIG. 2 when the voltage is substantially constant.

According to an exemplary embodiment, when the output voltage from the panel system exceeds the available limit, the output frequency of the inverter can be controlled to be higher by multiplying the output frequency reference by a constant factor. This increase of output frequency increases the required power and thereby the current drawn from the panel system.

In another exemplary embodiment, a controller is used for changing the output frequency of the inverter depending upon the available DC voltage and for keeping the V/f ratio constant. In this embodiment the controller can follow the V/f ratio below the $V_{boost}$. Above the $V_{boost}$ curve, the controller will not follow the V/f curve. The controller will increase the frequency, even if the voltage is constant.

Thus, the controller utilizes the maximum available current in the PV cell. Once the voltage falls below this $V_{boost}$ then the controller once again will follow the V/f curve. This can ensure that there is limited impact on the PV cell when there is a sudden decrease in the DC voltage.

According to an exemplary embodiment disclosed herein, the properties of a photovoltaic panel system are utilized fully even if the voltage of the photovoltaic panel does not reach its maximum value.

According to an exemplary embodiment disclosed herein, an arrangement includes a pump arranged to be rotated with an induction motor, an inverter, the output of which is electrically connected to the induction motor, and a photovoltaic panel system electrically connected to feed DC power to an inverter. The induction motor can be a three-phase motor. Further, the arrangement can include means (e.g., a user interface) for setting a voltage limit $V_{boost}$ and means (e.g., a processor) for determining continuously a voltage obtained from the photovoltaic panel system. The means for setting the voltage limit can be for example arranged in the inverter as a programmable setting and the value can be stored in the inverter. Similarly, the means for determining the voltage obtained from the panel system can be incorporated as a measurement sensor in the inverter. The inverter can continuously measure the input voltage.

The arrangement can include means for controlling the output frequency of the inverter such that the ratio between output voltage of the inverter and the output frequency is substantially constant, when the determined voltage of the photovoltaic panel system is below the set voltage limit. For example, the inverter can include a control scheme which produces maximal output voltage from the input DC voltage and changes the output frequency of the voltage according to the level of the output voltage.

Further, the arrangement can include means for controlling the output frequency of the inverter for keeping the voltage of the photovoltaic panel system substantially at the voltage limit, when the determined voltage of the photovoltaic panel system exceeds the voltage limit $V_{boost}$. The controller is, for example, implemented in the inverter.

Thus, it will be appreciated by those skilled in the art that the present invention can be embodied in other specific forms without departing from the spirit or essential characteristics thereof. The presently disclosed embodiments are therefore considered in all respects to be illustrative and not restricted.

The scope of the invention is indicated by the appended claims rather than the foregoing description and all changes that come within the meaning and range and equivalence thereof are intended to be embraced therein.

The invention claimed is:

1. A method of operating a pump system having a pump arranged to be rotated with an AC motor, an inverter, an output of which is electrically connected to the AC motor, and a photovoltaic panel system electrically connected to feed DC power to the inverter, the method comprising:
    setting a voltage limit ($V_{boost}$);
    determining continuously a voltage obtained from the photovoltaic panel system;
    when the determined voltage of the photovoltaic panel system is below the set voltage limit, controlling an output frequency of the inverter such that a ratio between an output voltage of the inverter and the output frequency is substantially constant; and
    when the determined voltage of the photovoltaic panel system exceeds the voltage limit ($V_{boost}$), controlling the output frequency of the inverter for keeping the voltage of the photovoltaic panel system substantially at the voltage limit.

2. A method according to claim 1, comprising:
    setting a frequency limit ($f_{limit}$); and
    limiting the output frequency of the inverter to the frequency limit.

3. A method according to claim 2, comprising:
    When the determine voltage of the photovoltaic panel system is above the set limit, controlling the voltage of the photovoltaic panel system by changing the output frequency of the inverter.

4. A method according to claim 1, comprising:
    when the determined voltage of the photovoltaic panel system is above the set limit, controlling the voltage of the photovoltaic panel system by changing the output frequency of the inverter.

5. A method according to claim 1, comprising:
    providing a frequency reference for the inverter output frequency;
    multiplying the frequency reference with a constant factor when the determined voltage of the photovoltaic system exceeds the set limit; and
    controlling the inverter with the multiplied frequency reference.

6. A pump arrangement comprising:
    a pump arranged to be rotated with an AC motor;
    an inverter, an output of which is electrically connected to the AC motor;
    a photovoltaic panel system electrically connected to feed DC power to the inverter;
    means for setting a voltage limit ($V_{boost}$);
    means for determining continuously a voltage obtained from the photovoltaic panel system;
    means for controlling an output frequency of the inverter such that a ratio between an output voltage of the inverter and the output frequency is substantially constant when a determined voltage of the photovoltaic panel system is below the set voltage limit; and
    means for controlling the output frequency of the inverter for keeping the voltage of the photovoltaic panel system substantially at the voltage limit when the determined voltage of the photovoltaic panel system exceeds the voltage limit ($V_{boost}$).

7. The pump arrangement according to claim 6, comprising:
    means for providing a frequency reference for the inverter output frequency;
    means for multiplying the frequency reference with a constant factor when the determined voltage of the photovoltaic system exceeds the set limit; and
    means for controlling the inverter with the multiplied frequency reference.

* * * * *